United States Patent [19]
Williamson

[11] Patent Number: 5,801,338
[45] Date of Patent: Sep. 1, 1998

[54] SCALE BEARING INSERT

[75] Inventor: Sidney Williamson, Las Cruces, N. Mex.

[73] Assignee: Metro Corporation, Las Cruces, N. Mex.

[21] Appl. No.: 734,898

[22] Filed: Oct. 22, 1996

[51] Int. Cl.⁶ .......................... G01G 21/02; G01G 21/08
[52] U.S. Cl. ..................... 177/179; 177/256; 177/DIG. 9
[58] Field of Search .......................... 177/179, 187, 177/188, 189, 256, DIG. 9

[56] References Cited

U.S. PATENT DOCUMENTS

| 4,452,326 | 6/1984 | Hansen et al. | 177/256 |
| 4,458,771 | 7/1984 | Hansen et al. | 177/256 |
| 4,650,016 | 3/1987 | Andriewsky | 177/211 |

*Primary Examiner*—Michael L. Gellner
*Assistant Examiner*—Randy W. Gibson
*Attorney, Agent, or Firm*—Wood, Phillips, VanSanten, Clark & Clark

[57] ABSTRACT

A platform weighing scale includes a base with vertical corner stands and a weight supporting platform including depending corner bearings. A weight sensing apparatus is supported on the base corner stands and supports the weight supporting platform so that it is moveable relative to the base. A weight sensing mechanism is responsive to movement of the platform for operating a weight indicating device. The weight sensing mechanism includes a plate operatively associated with the weight indicating device. A pair of primary levers are secured at one end to the plate and diverge therefrom relative to a longitudinal centerline and define a select angle therebetween. Each primary lever includes an upper notch receiving one of the corner bearings and a lower notch receiving one of the corner stands so that movement of the platform causes pivotal movement of the levers to move the plate. A bearing insert is fit to each primary lever between the upper notch and the corner bearing and between the lower notch and the corner stand. Each bearing insert is formed to include a pair of troughs received in the notches for bearing on the corner bearing and corner stand. The troughs are angled relative to the primary levers corresponding to the select angle so that the levers fulcrum about an axis perpendicular to the centerline.

11 Claims, 3 Drawing Sheets

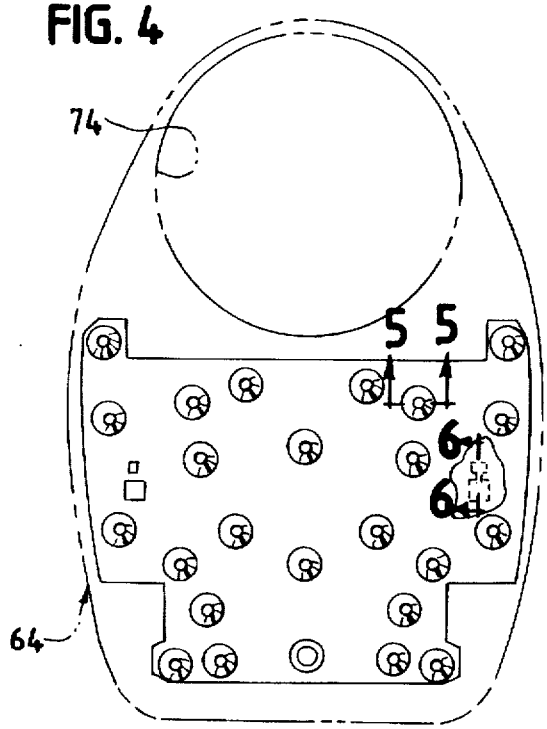
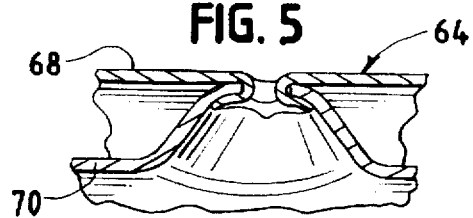
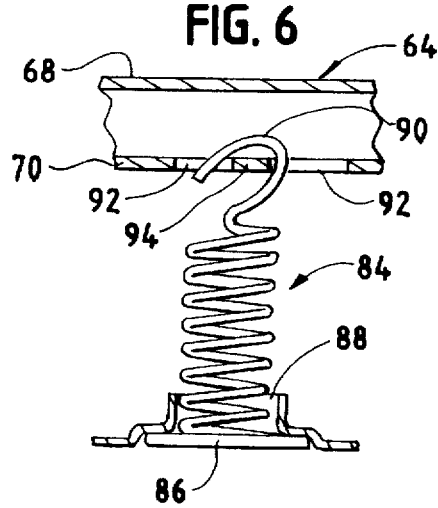
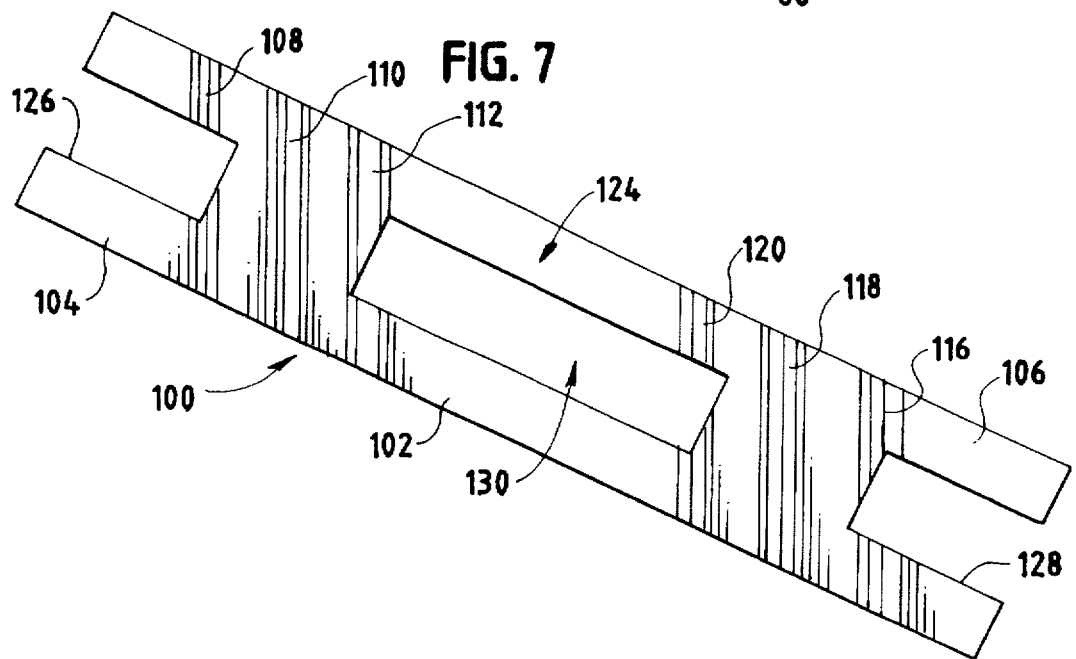
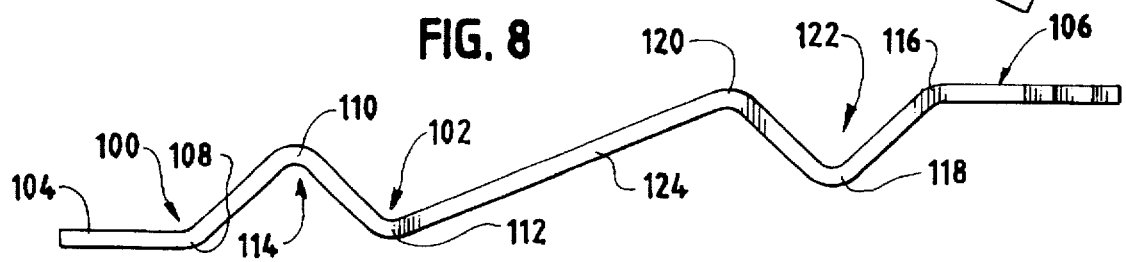

SCALE BEARING INSERT

FIELD OF THE INVENTION

This invention relates to platform weighing scales and, more particularly, to a bearing insert for a platform weighing scale.

BACKGROUND OF THE INVENTION

Various types of platform weighing scales have been used. These scales include a conventional mechanical analog scale having a base and a platform moveable relative to the base. A lever structure is moveable responsive to movement of the platform. In one form, the lever structure causes rotation of a dial. In another form, the lever structure causes rotation of a pointer relative to a fixed dial. The lever structure usually comprises a pair of primary levers and a pair of secondary levers. The primary levers are pivotally mounted to corner stands or slots at the rear or front of the base and converge to a common support in the form of a plate adjacent the opposite end of the base. The secondary levers are pivotally mounted to corner stands or slots at the other of the front or rear corners of the base. The other end of each of the secondary levers is connected to a primary lever intermediate its ends. Each of the primary and secondary levers has a V-shaped notch located near the pivoted end for supporting knife edge metal hangers fastened to the platform. The plate is operatively associated with and controls movement of the dial or pointer, according to the particular type of scale.

With the above described scales, the primary levers and secondary levers extend at an acute angle relative to a longitudinal centerline of the scale. The primary levers are fixedly secured to the support plate. As such, the plate and primary levers move as a fixed unit. Typically, the corner stands provide a knife edge in a plane perpendicular to a plane of the primary lever. Nevertheless, because of the fixed angle between the primary levers, defined by the manner in which they are secured to the support plate, the individual primary levers do not pivot as with a perfect hinge about the longitudinal centerline. This relationship can cause frictional problems because the levers do not fulcrum perpendicular to the centerline but are angled at a select acute angle, typically about 26°. This interference, although small, does cause friction. Friction can produce to non-linearity of weight measurement as well as different weight measurement due to different positioning on the platform.

In some instances manufacturers have attempted to minimize the above problem by cutting the V-notches at an angle so that the levers fulcrum perpendicular to the base centerline. Nevertheless, other problems remain. Particularly, it has been found that the knife edge of the corner stand or corner slots cut or dig into the lever. This further increases friction, causing difficulty in operation. This also creates excessive hysteresis in scale operation.

The present invention is directed to overcoming one or more of the problems discussed above in a novel and simple manner.

SUMMARY OF THE INVENTION

In accordance with the invention, there is disclosed a platform weighing scale using a bearing insert to reduce friction in scale operation.

Broadly, there is disclosed herein a platform weighing scale including a base with vertical corner stands and a weight supporting platform including depending corner bearings. A weight sensing apparatus is supported on the base corner stands and supports the weight supporting platform so that it is moveable relative to the base. A weight sensing mechanism is responsive to movement of the platform for operating a weight indicating mechanism. The weight sensing mechanism includes a plate operatively associated with the weight indicating mechanism. A pair of primary levers are secured at one end to the plate and diverge therefrom relative to a longitudinal centerline and define a select angle therebetween. Each primary lever includes an upper notch receiving one of the corner bearings and a lower notch receiving one of the corner stands so that movement of the platform causes pivotal movement of the levers to move the plate. A bearing insert is fit to each primary lever between the upper notch and the corner bearing and between the lower notch and the corner stand. Each bearing insert is formed to include a pair of troughs received in the notches for bearing on the corner bearing and corner stand. The troughs are angled relative to the primary levers corresponding to the select angle so that the levers fulcrum about an axis perpendicular to the centerline.

The weight sensing mechanism further includes a pair of secondary levers each secured at one end to one of the primary levers and diverging therefrom relative to the longitudinal centerline and defining the select angle therebetween. Each primary lever includes an upper notch receiving one of the corner bearings and a lower notch receiving one of the corner stands. A bearing insert is fit to each secondary lever between the upper notch and the corner bearing and between the lower notch and the corner stand. As a result, the secondary levers fulcrum about an axis perpendicular to the centerline.

It is a feature of the invention that the bearing inserts are wider than the primary levers and the secondary levers.

It is another feature of the invention that the bearing inserts are of hardened steel.

It is a further feature of the invention that the inserts are reversible for use on either primary lever or secondary lever.

In accordance with a further aspect of the invention there is disclosed a platform weighing scale in which the weight sensing mechanism includes a plate operatively associated with the weight indicating device. A pair of primary levers are secured at one end to the plate and diverge therefrom relative to a longitudinal centerline and define a select angle therebetween. A pair of secondary levers are each secured at one end to one of the primary levers and diverge therefrom relative to the longitudinal centerline and define the select angle therebetween. Each lever includes an upper notch receiving one of the corner bearings and a lower notch receiving one of the corner stands so that movement of the platform causes pivotal movement of the levers to move the plate. A bearing insert is fit to each of the levers between the upper notch and the corner bearing and between the lower notch and the corner stand. Each bearing insert is formed to include a pair of troughs received in the notches for bearing on the corner bearing and corner stand. The troughs are angled relative to the primary levers corresponding to the select angle so that the primary levers fulcrum about an axis parallel to an axis about which the secondary levers fulcrum.

More particularly, the bearing inserts are made from tempered steel formed to fit over the end of each lever. The bearing inserts are wider than the levers. With this extra width the upper corner bearings and lower corner stands have a wider knife to span across the bearing insert, thus reducing friction. Also, the troughs are formed at an angle so that the fulcrum of the lever is perpendicular to the line of the levers, i.e., the longitudinal centerline. Moreover, the bearing inserts are reversible so that one bearing insert can be installed on any lever by reversing it or rotating it. When installed on the levers, all upper corner bearings and lower corner stands are parallel. The use of the bearing inserts reduces both friction and hysteresis, giving the scale greater sensitivity.

Further features and advantages of the invention will be readily apparent from the specification and from the drawing.

BRIEF DESCRIPTION OF THE DRAWING

FIG. 4 is a plan view of a platform for the scale of FIG. 1;

FIG. 5 is a sectional view taken along the line 5—5 of FIG. 4;

FIG. 6 is a sectional view taken generally along the line 6—6 of FIG. 4 showing structure for securing the platform to the base;

FIG. 7 is a top view of the bearing insert according to the invention; and

FIG. 8 is a side view of the bearing insert of FIG. 7.

DETAILED DESCRIPTION OF THE INVENTION

Figure 1:
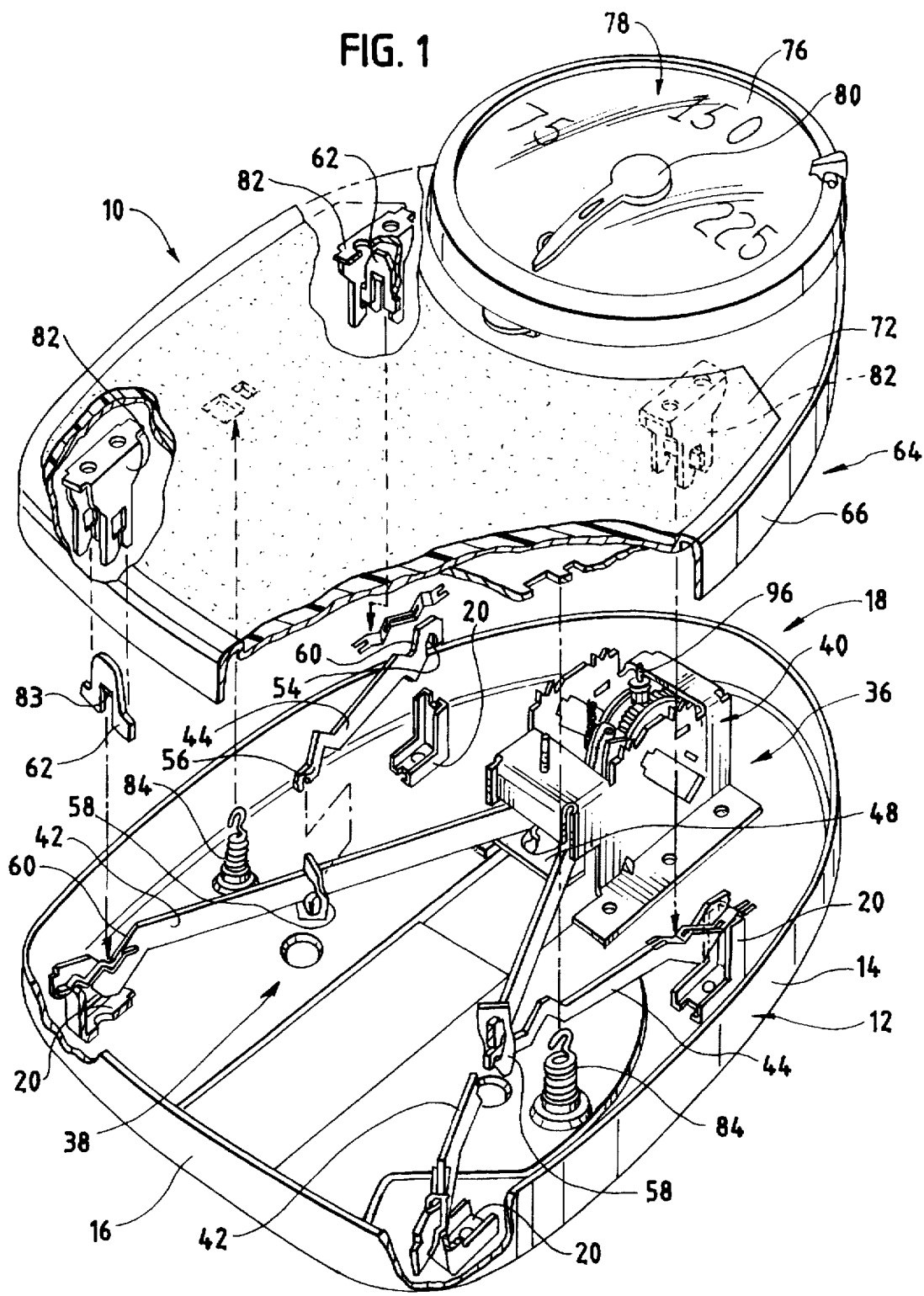
FIG. 1 is an exploded, perspective view, with parts cut away for clarity, of a big dial platform scale including bearing inserts according to the invention.

Referring to the drawings and, more particularly, to FIG. 1, there is shown a big dial platform weighing type bathroom scale 10 according to the invention. The scale 10 is provided with a base 12 as a stamped sheet metal member having an upstanding peripheral rim 14. The shape of the base 12 may be chosen to make any particular scale design and is generally "bullet" shaped in the illustrated embodiment of the invention, with a generally rectangular frontmost weight end 16 and an opposite, rounded rearmost indicating end 18. The sheet metal base 12 is adapted to rest directly upon a floor or floor covering and support the mechanism of the scale therein. The mechanism support is formed by four slotted lower corner stands 20 at opposite corners of the rectangular weight end 16, as illustrated.

Figure 2:
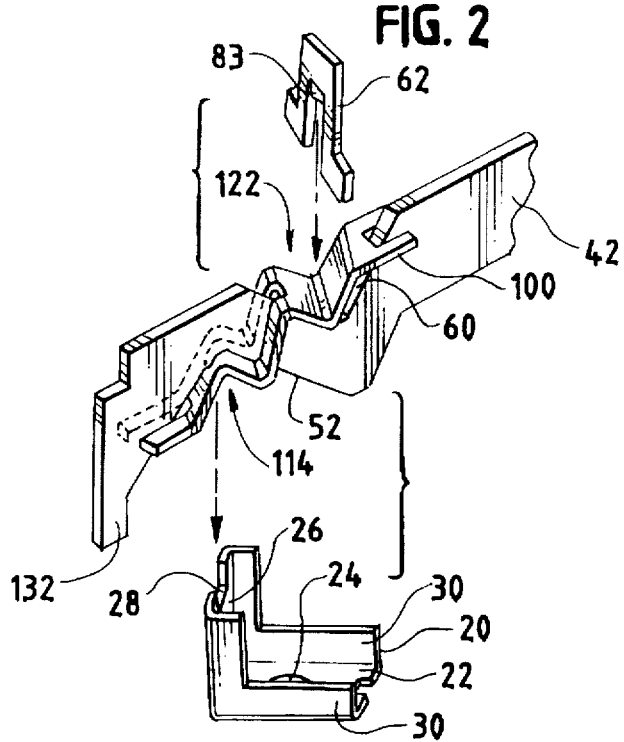
FIG. 2 is a detailed, exploded perspective view particularly illustrating a portion of a weight sensing mechanism of the scale of FIG. 1 including the bearing insert.

Referring also to FIG. 2, each lower corner stand 20 is generally L-shaped and includes a lower leg 22 having an opening 24 for securing to the base 12 and an upper leg 26 having a knife edge slot 28 for supporting the scale mechanism, as described below. The corner stands are provided with opposite side walls 30 for added strength.

Figure 3:
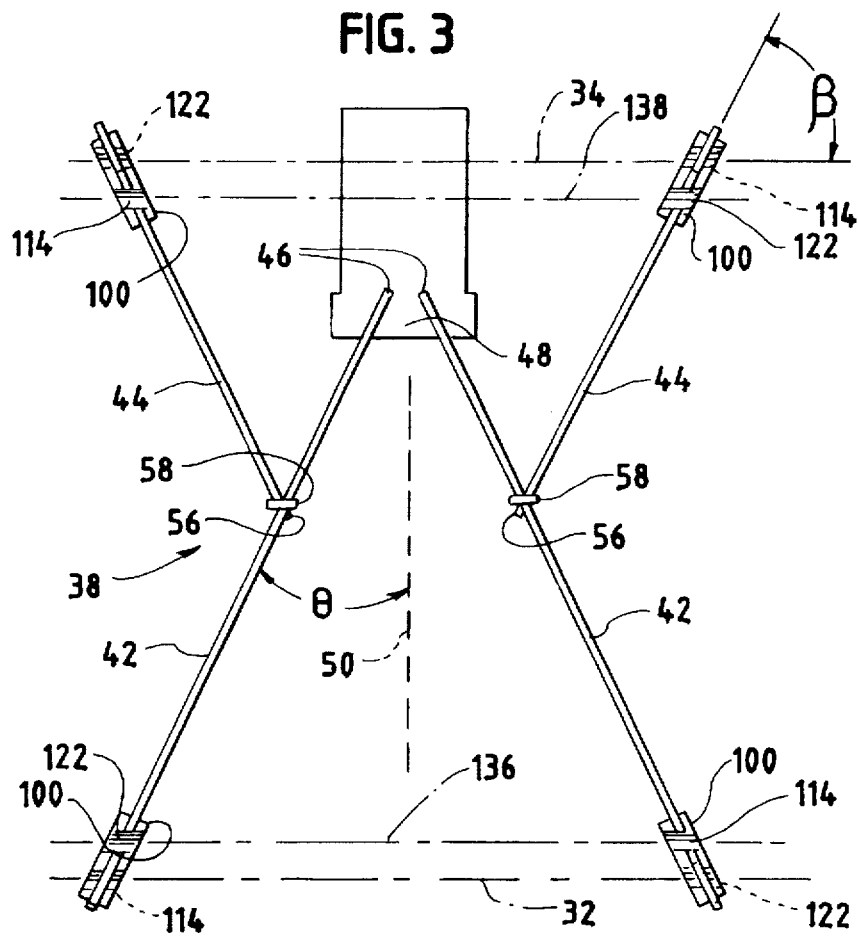
FIG. 3 is a plan view schematically illustrating operation of the weight sensing mechanism of the scale of FIG. 1, with other parts removed for clarity.

The knife edge slots 28 of the frontmost corner stands 20 are in linear alignment to define an axis, represented by a dashed line 32, see FIG. 3, discussed below. Likewise, the rearmost corner stands 20 are in linear alignment to define an axis represented by a dashed line 34, see FIG. 3, also discussed below.

A weight sensing apparatus 36 consists of a weight sensing mechanism 38 which operates a weight indicating mechanism 40. The weight sensing mechanism 38, as illustrated in FIGS. 1–3, consists of a pair of primary levers 42 and a pair of secondary levers 44 arranged in interconnected fashion and received in the corner stand slots 28, as described below.

The primary levers 42 and secondary levers 44 are of conventional construction. Each primary lever 42 is identical in construction. Likewise, each secondary lever 44 is identical in construction. Each primary lever 42 comprises an elongate bar having a rear end 46 securely fastened to a support plate or nose iron 48. The pair of primary levers 42 extend frontwardly from the plate 48 and diverge relative to one another and to a longitudinal centerline, represented by dashed line 50, see FIG. 3, and defining a select acute angle θ therebetween. In the illustrated embodiment of the invention, the angle θ is approximately 26.5°. The primary levers 42 are each arranged on edge relative to the base 12 and have lower, downwardly opening V-shaped notches 52, see FIG. 2, to receive one of the frontmost corner stand slots 28.

The secondary levers 44 are also arranged on edge relative to the base 12. The secondary levers 44 also include lower V-shaped notches 54, see FIG. 1, for receiving and being supported by one of the rearmost corner stand slots 28. A front end 56 of each secondary lever 44 is connected to a primary lever 42 intermediate its ends using a conventional lever hanger 58.

Each of the primary levers 42 and secondary levers 44 has an upper V-shaped notch 60. Each notch 60, which is located near the pivoted end, receives and supports a knife edge upper corner bearing 62, see FIG. 1.

A weight supporting platform 64 is formed as a stamped sheet metal member having an integral downwardly depending peripheral rim 66. The platform 64 is of a shape corresponding to the shape of the base 12 but of a slightly larger size to be received thereon, so that the platform rim 66 receives the base rim 14. As a result, the platform rim 66 hides most of the base rim 14 from view.

Referring also to FIGS. 4 and 5, the platform 64 includes a weight receiving surface 68 staked, where indicated, to a lower support plate 70. The platform 64 is secured to the support plate 70 as by staking at each of the circular areas shown in FIG. 4. A mat 72, see FIG. 1, overlies the surface 68. The mat 72 may be of, for example, rubber, to provide proper footing. The platform includes a circular opening 74 for receiving a lens 76 covering a dial 78 and pointer 80.

Depending downwardly from the underside of the platform 64 are four U-shaped brackets 82, three of which are shown. The brackets 82 are positioned to coincide with the position of the lever upper V-notches 60. Each bracket 82 supports one of the corner bearings 62, as illustrated. Each corner bearing 62 has a knife edge slot 83 received in one of the upper V-notches 60. As a result, any load on the platform support surface 68 is transferred via the brackets 82 and corner bearing 62 to the weight sensing mechanism 38 in a conventional manner.

A pair of hookup springs 84, see also FIG. 6, are used for fastening the platform 64 to the base 12. Particularly, each spring 84 has an enlarged lower end 86. The spring 84 is inserted upwardly through an associated opening 88 in the base 12 with an upper hook 90 passing through slotted openings 92 to engage a wall 94 in the support plate 70.

The weight indicating mechanism 40 includes a gear mechanism, not shown in detail herein, driven by the plate 48 and rotationally driving an output shaft 96 secured to and rotating the pointer 80 relative to the dial 78 for indicating weight on the platform 64. Particularly, the gear mechanism converts generally linear movement of the plate 48 to rotational movement of the shaft 96.

The present invention is particularly directed to bearing inserts used for reducing friction and hysteresis in the weight sensing mechanism 38 to provide greater sensitivity of scale operation. The bearing inserts could be used with any type of scale mechanism using a lever structure for driving an indicating mechanism.

Referring to FIGS. 7 and 8, a bearing insert 100 according to the invention is illustrated. The bearing insert 100 comprises an elongate, generally rectangular plate 102 made from tempered steel and formed to fit over the pivoting end of each lever 42 and 44. The plate 102 has a smooth surface. The plate 102 is formed with angular, transverse bends as described between a first end 104 and a second end 106. As a result, the first end 104 lies in a plane parallel to a plane of the second end 106. From the first end 104, the plate 102 is bent, as illustrated in FIG. 8, upwardly at 108, reverse downwardly bent at 110, and then reverse upwardly bent at 112 to form a trough 114. The bends 108, 110 and 112 are at an angle. The angle of the bends is equal to the angle $\theta$, see FIG. 3. Starting from the second end 106, the plate 102 is downwardly bent at 116, reverse upwardly bent at 118, and reverse downwardly bent at 120 to define a trough 122. The bends 116, 118 and 120 are at an angle. The angle of the bends is equal to the angle $\theta$, see FIG. 3. Disposed between the bends 112 and 120 is a planar central portion 124. The bends 116, 118 and 120 are parallel to the bends 108, 110 and 112. A rectangular notch 126 is provided at the first end. A rectangular notch 128 is provided at the second end 106. The notches 126 and 128 extend slightly past the initial respective bends 108 and 116. An elongate rectangular slot 130 is provided in the central section 124 and extends just past the bends 112 and 120.

The width of the plate 102 is substantially greater than a thickness of the levers 42 and 44. The width of the notches 126 and 128 and the slot 130 are slightly greater than the thickness of the levers 42 and 44.

The scale includes four bearing inserts 100, one for each lever 42 and 44. The bearing insert 100 is fit over one of the levers 42 or 44. Particularly, as illustrated in FIG. 2, the bearing insert is shown fit over the pivoting end of one of the primary levers 42. The insert 100 is installed by inserting a distal end 132 of the lever through the central slot 130 and sliding and turning the insert until it is fit to the lever with the first trough 114 being received in the lower notch 52 and the second trough 122 being received in the upper notch 60. The insert notches 126 and 128 receive portions of the lever notches so that the insert 100 is seated properly, as shown. As fit in this manner, the troughs 114 and 122 are angled relative to the lever 42, as shown at the select acute angle $\theta$. The trough 114 receives the corner stand slot 28, while the trough 122 receives the corner bearing knife edge slot 83.

In accordance with the invention, the bearing insert 100 is reversible. By reversing and/or rotating the bearing insert, it can be fit to each of the primary levers 42 and secondary levers 44. With a bearing insert fit to each lever 42 and 44, the levers 42 and 44 fulcrum perpendicular to the line of the levers, i.e., the centerline 50. Particularly, the troughs 114 and 122 provide an effective notch which is angled relative to the levers corresponding to the angle of the levers to the centerline. As described above, the corner stand slots 28 are all parallel, as represented by the axis lines 32 and 34 of FIG. 3. Likewise, the frontmost corner bearing slots 83 are linearly aligned, as represented by a dashed line 136 of FIG. 3 and the rearmost corner bearing slots 83 are linearly aligned as represented by the dashed line 138 of FIG. 3. The lines 32, 34, 136 and 138 are all parallel. The line of the load bearing is thus represented by the lines 136 and 138. The bearing insert troughs 114 and 122, due to the angular relationship, are aligned with the parallel lines 32, 34, 136 and 138. The levers 42 and 44 fulcrum about the axis lines 32 and 34. The fulcrum is perpendicular to the centerline of the levers and parallel to the line of the load bearings. Also, the extra width of the inserts 100, the bearing knife slots 83 and the corner stand knive slots 28 are much wider to span across the bearing insert. This greatly reduces friction of operation.

Thus, by using bearing inserts as described, both friction and hysteresis are reduced, giving the scale greater sensitivity. Also, the bearing inserts being made out of a tempered steel, such as a type of spring steel, that has a hard surface. This hard surface prevents the knife edges from digging in. This also minimizes friction as well as reducing hysteresis in back weighing.

Thus, the invention broadly comprehends the use of bearing inserts to increase sensitivity of scale operation.

I claim:

1. A platform weighing scale comprising:

a base including vertical corner stands;

a weight supporting platform including depending corner bearings; and weight sensing apparatus supported on said base corner stands, and supporting said weight supporting platform so that said platform is moveable relative to said base, including a weight sensing mechanism responsive to movement of said platform for operating a weight indicating mechanism, the weight sensing mechanism including a plate operatively associated with the weight indicating mechanism, a pair of primary levers secured at one end to said plate and diverging therefrom relative to a longitudinal centerline and defining a select angle therebetween, each primary lever including an upper notch receiving one of said corner bearings and a lower notch receiving one of said corner stands so that movement of said platform causes pivotal movement of said levers to move said plate, and a bearing insert fit to each said primary lever between the upper notch and the corner bearing and between the lower notch and the corner stand, each bearing insert being formed to include a pair of troughs received in said notches for bearing on the corner bearing and corner stand, the troughs being angled relative to the primary levers corresponding to the select angle so that the levers fulcrum about an axis perpendicular to said centerline.

2. The platform weighing scale of claim 1 wherein said weight sensing mechanism further includes a pair of secondary levers each secured at one end to one of said primary levers and diverging therefrom relative to the longitudinal centerline and defining the select angle therebetween, each secondary lever including an upper notch receiving one of said corner bearings and a lower notch receiving one of said corner stands, and a bearing insert fit to each said secondary lever between the upper notch and the corner bearing and between the lower notch and the corner stand, each bearing insert being formed to include a pair of troughs received in said notches for bearing on the corner bearing and corner stand, the troughs being angled relative to the secondary levers corresponding to the select angle so that the secondary levers fulcrum about an axis perpendicular to said centerline.

3. The platform weighing scale of claim 1 wherein said bearing inserts are wider than said primary levers.

4. The platform weighing scale of claim 2 wherein said bearing inserts are wider than said primary levers and said secondary levers.

5. The platform weighing scale of claim 1 wherein said bearing inserts are of hardened steel.

6. The platform weighing scale of claim 1 wherein said inserts are reversible for use on either primary lever.

7. The platform weighing scale of claim 2 wherein said inserts are reversible for use on either primary lever or either secondary lever.

8. A platform weighing scale comprising:
- a base including four vertical corner stands at each corner of a rectangle;
- a weight supporting platform including four depending corner bearings at each corner of a rectangle; and
- weight sensing apparatus supported on said base corner stands, and supporting said weight supporting platform so that it is moveable relative to said base and a weight sensing mechanism responsive to movement of said platform for operating a weight indicating device, the weight sensing mechanism including
  - a plate operatively associated with the weight indicating device,
  - a pair of primary levers secured at one end to said plate and diverging therefrom relative to a longitudinal centerline and defining a select angle therebetween, and a pair of secondary levers each secured at one end to one of said primary levers and diverging therefrom relative to the longitudinal centerline and defining the select angle therebetween, each lever including an upper notch receiving one of said corner bearings and a lower notch receiving one of said corner stands so that movement of said platform causes pivotal movement of said levers to move said plate, and
  - a bearing insert fit to each said lever between the upper notch and the corner bearing and between the lower notch and the corner stand, each bearing insert being formed to include a pair of troughs received in said notches for bearing on the corner bearing and corner stand, the troughs being angled relative to the primary levers corresponding to the select angle so that the primary levers fulcrum about an axis parallel to an axis about which the secondary levers fulcrum.

9. The platform weighing scale of claim 8 wherein said bearing inserts are wider than said primary levers.

10. The platform weighing scale of claim 8 wherein said bearing inserts are of hardened steel.

11. The platform weighing scale of claim 8 wherein said inserts are reversible for use on either primary lever or secondary lever.

* * * * *